Figure 1:
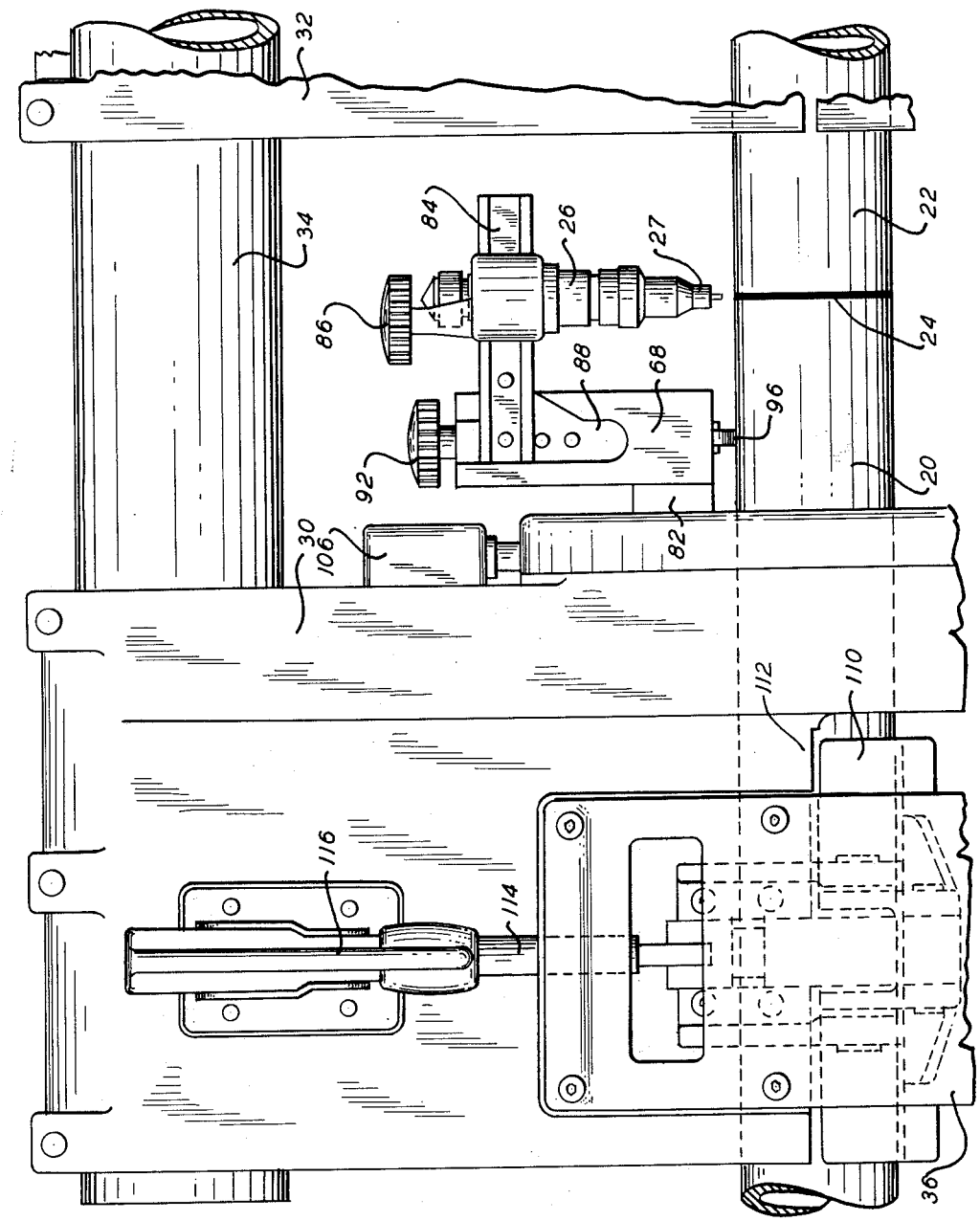

April 11, 1961 J. LASLO 2,979,598
PIPE WELDING
Filed Nov. 16, 1959 3 Sheets-Sheet 1

INVENTOR.
JOHN LASLO
BY
*Leslie S. Byer*
ATTORNEY

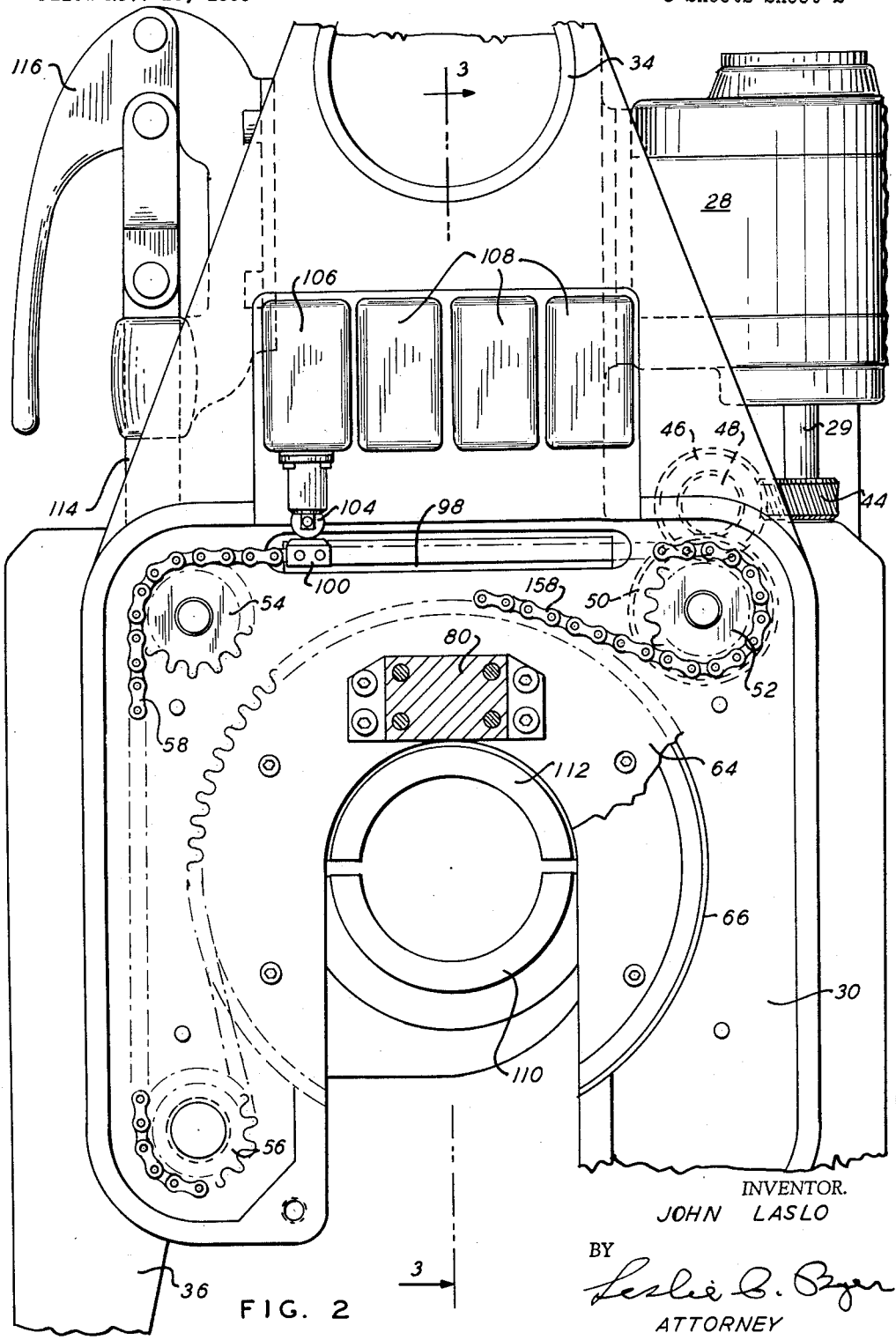

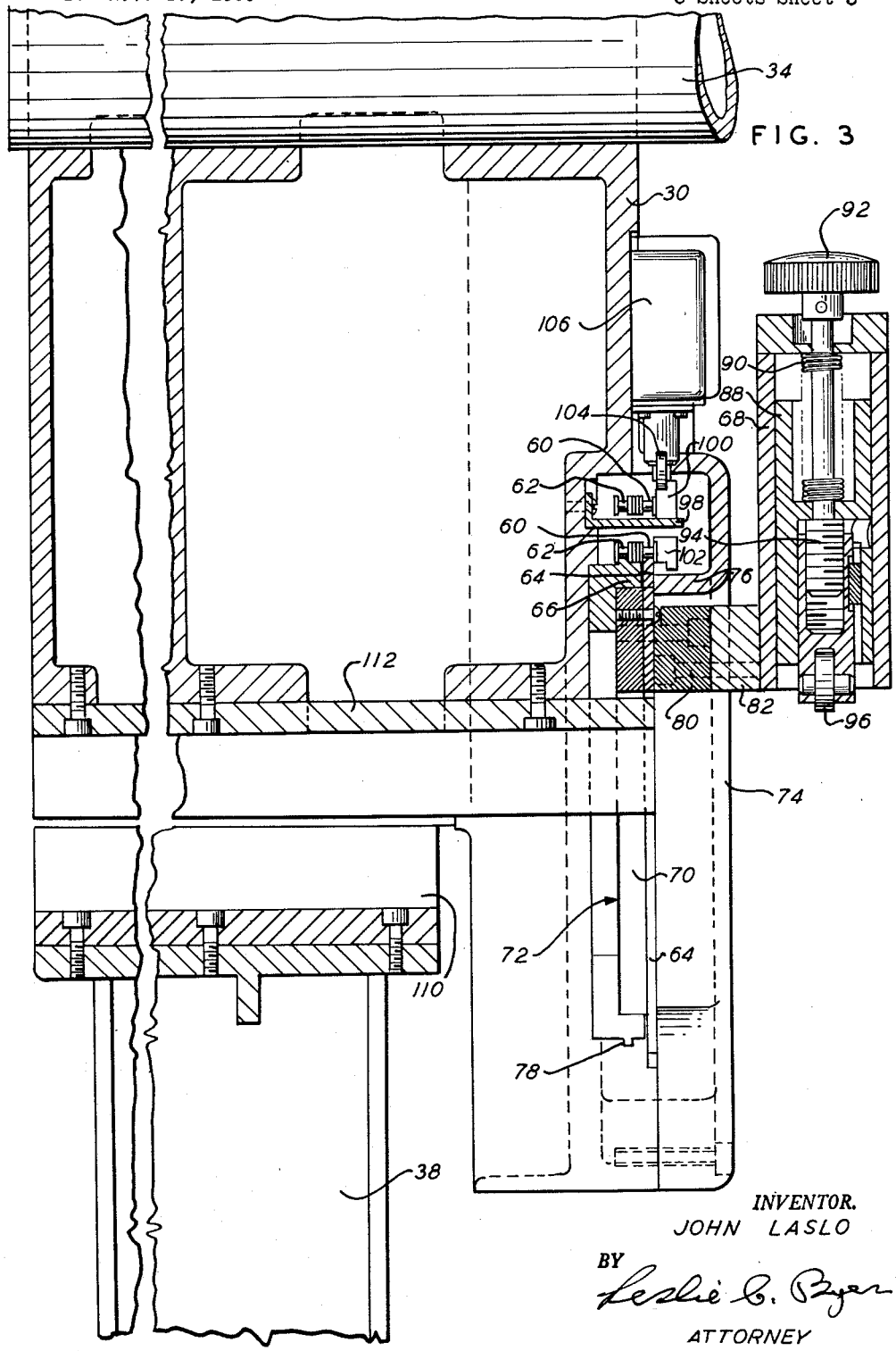

United States Patent Office 2,979,598
Patented Apr. 11, 1961

2,979,598
PIPE WELDING
John Laslo, South Plainfield, N.J., assignor to Air Reduction Company, Incorporated, New York, N.Y., a corporation of New York
Filed Nov. 16, 1959, Ser. No. 853,053
8 Claims. (Cl. 219—60)

This invention relates to apparatus and methods for performing rotational, lathe-like operations upon non-rotatable workpieces the ends of which may be inaccessible, such as pipe lines, etc. More specifically, the invention relates to apparatus and methods particularly suited for welding pipe lines in the field in the course of installation.

An object of the invention is to reduce the cost of pipe welding operations in the installation of pipe lines in the field.

Another object is to increase the speed of the pipe welding operation in order that the construction of a pipe line may proceed at a satisfactory rate without being held up by the slowness of the welding operation compared to the other operations incident to the installation.

A further object is to improve the quality of the weld by promoting uniform rotation of the welding torch by avoiding speed variations due to its driving gear.

The welding torch of the machine described herein is supported on a C-shaped sprocket segment which is rotatably mounted on a C-shaped frame so that when the open portions of these members coincide, the device as a whole may be slipped sidewise over a pipe to which the frame is then clamped. The sprocket is chain driven and provides a rugged and troublefree assembly for use under muddy and dusty condition inasmuch as the chain, unlike gearing, is self-clearing of any accumulations of dust and dirt thereon. A feature of the invention is a chain guide member cooperating with the C-shaped sprocket segment to prevent sagging of the drive chain when it is passing over the open portion of the sprocket segment. Eliminating this sagging of the drive chain will prevent a consequent change is rotational speed of the sprocket segment when this sag is taken up by the drive chain moving at constant speed and transferring its driving connections from the leading to the trailing edge of the open portion of the sprocket segment.

The device is relatively simple and compact and is easy to operate under field conditions.

By using a motor of adjustable speed, the rotation of the welding torch may be made such as to promote the production of an optimum weld, preferably flush on the outside, without addition of metal, and with no dripping or distortion inside the pipe. A flush weld is known to be desirable in order to avoid concentrations of stress which occur at a crowned weld. A smooth inside wall at the weld is of course desirable to promote smooth flow of liquid or gas in the pipe when in service.

Other objects, features and advantages will appear from the following more detailed description of an illustrative embodiment of the invention, which will now be given in conjunction with the accompanying drawings.

In the drawings,
Fig. 1 is an elevational view of the major portion of an embodiment of the invention;
Fig. 2 is an end view of the portion of the embodiment of the invention that is located on one side of a joint in the pipe line, showing portions broken away; and
Fig. 3 is a longitudinal sectional view of the portion of the embodiment of the invention that is shown in end view in Fig. 2.

As shown in Fig. 1, two lengths 20 and 22 of pipe to be welded together at a butt joint 24 are shown supported in working relationship to a welding torch 26 in a manner to permit rotation of the torch around the peripheries of the pipes along the line of the joint between them, the object being to carry the torch to all portions of the joint successively, thereby to complete a circumferential weld.

As shown in Fig. 2, a motor 28 is provided for moving the torch through the intermediary of gearing as will be described below. The motor and gearing are supported upon a combination supporting and clamping member 30 which straddles the pipe length 20 and can be clamped thereto by means which will be described below. A clamping member 32 is provided which straddles the pipe length 22 and can be clamped thereto. The members 30 and 32 are spaced from one another and are secured to a member 34 which may be a relatively short length of pipe. The member 30 is provided with leg members 36 and 38 which serve to support the device in such a manner that the pipes to be welded are held sufficiently far from the ground to permit free movement of a tool support and tool such as the torch 26 around the entire circumference of the work. The member 32 is likewise provided with suitable leg members (not shown).

The gearing from the motor to the tool holder and tool will now be described. As shown in Fig. 2, the shaft 29 of the motor 28 is provided with a screw wheel 44 which meshes with another screw wheel 46. Integral with and concentric to the wheel 46 is a pinion 48 which meshes in turn with a spur wheel 50. The wheel 50 is integral with and concentric to a driving sprocket wheel 52. The sprocket 52, together with a plurality of idler driven sprockets 54, 56, serves to support a multiple width chain 58, preferably a steel roller chain. The chain is shown as comprising two widths, of which the width 60 (Fig. 3) is primarily for driving the tool and the width 62 is for guiding the chain as will be described below.

The periphery of the driving width 60 of the chain 58 engages a portion of the periphery of a single width C-shaped sprocket segment 64 which is supported for rotation upon the member 30 in concentric relationship to the longitudinal axis of the pipes 20, 22. The open portion of the sprocket segment 64 permits the welding device as a whole to be slipped sidewise over the pipe. It will be noted that the chain does not encircle the pipe or other workpiece. The periphery of the guiding width 62 of the chain 58 slides over a stationary C-shaped chain supporting segment 66, thereby effectively preventing the chain 58 as a whole from sagging when the driving width of the chain is opposite the open portion of the rotatable C-shaped sprocket segment 64.

A tool supporting member 68 is provided that is integral with or attached to the sprocket segment 64 to hold a torch 26 or other tool and guide it in operative relationship to the butt joint 24 where the weld is to be made.

Referring more particularly to Fig. 3, the C-shaped sprocket segment 64 has attached thereto or integral therewith a C-shaped boss or boss-like bearing member 70 which forms one member of a cylindrical segmental bearing of which the second member is formed by a cylindrical dished, hollow portion or depression 72 of the chain supporting member or chain guide 66. The sprocket segment 64 is held in bearing relationship to the chain guide member 66 by a C-shaped cover 74, the portion 76 of the cover member being of slightly smaller diameter than the sprocket segment and bearing lightly upon the outer side of the sprocket segment within and close to the circular segment defined by the hollows between the sprocket teeth. The outer rim of the chain guide member 66 has a circumferential ridge 78 of outer radius substantially that of the circular segment defined by the hollows between the sprocket teeth so that the width 62 of the chain may slide over the ridge 78 and thus be supported by the chain guide when any portion of the chain is opposite the open portion of the sprocket and hence is not in position to be supported by the sprocket. The ridge may be continuous around the entire circular segmental periphery of the chain guide member in order that it may support the chain at all times regardless of the angular position of the open portion of the sprocket segment. The ridge should of course be continuous over at least that portion of the pitch circle of the sprocket that is in contact with the chain. The bearing surfaces of the boss 70 and dished bearing cavity 72 should be accurately machined to provide a smoothly working bearing concentric with the longitudinal axis along which the pipe to be welded is supported. The ridge 78 of the chain guide should also be accurately machined to be concentric with the pipe axis and its outer diameter should be sufficiently precisely determined in order to support the chain at a uniform radius whether or not the portion of the chain sliding on the chain guide is also in contact with the sprocket.

The tool holder or support 68 may be secured to the sprocket segment 64, or to the sprocket segment and the bearing member 70, as by means of a bracket 80 and a spacer 82, as shown in Fig. 3. The tool 26 is slidably mounted upon a bracket 84 (Fig. 1) so that the position of the tool may be adjusted longitudinally of the pipe to bring the tool directly over the butt joint 24 or other desired position on the workpiece. The tool may be secured in place upon the bracket 84 as by means of a tool tightening screw 86. The bracket 84 is secured to a slidable member 88 within the casing of the tool support member 68, the member 88 being urged downward toward the workpiece by a compression spring 90 the degree of compression of which may be adjusted as by means of a screw having an adjusting knob 92 which turns a screw 94 in a nut that is attached to or integral with the member 88. Attached to or integral with the slidable assembly is a work-engaging roller 96 which by means of the spring 90 and associated assembly is urged against the workpiece and automatically maintains a substantially constant spacing between the tool and the work. In the arrangement illustrated the electrode 27 of the welding torch and the line of contact of the guide roller 96 with the pipe are preferably in the same vertical plane.

A portion of the chain which is not engaging the sprocket segment may be passed over a horizontal chain guide 98 (Fig. 2). Attached to one side of the chain may be one or more cam-like members 100, 102, each individual to a single link of the chain. As a cam member passes over the horizontal guide, it may engage a roller 104 of a control switch 106 to lift the roller and actuate the switch, as for purposes of controlling the motion of the tool, for arc starting, stopping, reversing direction of travel of the tool, or other control operations. A plurality of additional limit switches 108 may be provided as required.

The motor 28 may be electronically controlled for constant adjustable speed in order that the tool may move over the work at a substantially constant speed. This feature is particularly important in welding because if the torch moves too slowly at times a hole may be burned in the pipe and if the torch moves too fast the weld may be of poor quality.

One of the idler sprockets 56 for the chain drive is preferably made adjustable as by means of an eccentric in order that the chain may be adjusted to a proper degree of tautness.

Any suitable means may be provided for clamping the device as a whole to the pipe on both sides of the joint. Clamping means for one side are shown in the drawings, comprising a hinged lower jaw 110, an upper jaw 112, a toggle rod 114 and a clamping handle 116. Similar or identical clamping means (not shown) may be used on the other side of the joint.

The motion of the tool may be controlled in any desired manner. For example, in welding, the torch may be started at the top or "12 o'clock" position, carried down on one side of the pipe to the "6-o'clock" position, the torch then being shut off and moved back to the top, whereupon the weld is started again and carried down to the bottom on the other side. Alternatively, the weld may be carried continuously around the circumference of the pipe, and the weld can be overlapped. In another case, when welding a grooved joint by using a consumable electrode or by feeding filler material to the arc established between the groove joint and a non-consumable electrode, the welding cycle may consist of laying a stringer bead in one rotation, then reversing the motion of the torch and oscillating the torch to fill the joint. Provision for oscillation may be incorporated in the tool holder 68 or in the torch 26.

The device of the invention may be used for various purposes other than welding. For example, a torch may be used for cutting, or tools other than welding torches may be employed. Another use would be in truing up the ends of the pipes before joining. In general other machining or lathelike operations may be performed.

While the chain has been shown herein with one driving sprocket and two idlers, additional idlers may be used and, if desired, the chain can be brought into engagement with the C-shaped sprocket segment over a greater part of its total circumference than that illustrated. The chain may also be of triple width or wider, if desired, with one or more widths passing over the chain guide and one or more widths driving the C-shaped sprocket segment.

For the purpose of clarity in the drawings, the electric wiring of the motor, welding torch, limit switches, etc. has not been shown. The electrical supply system and wiring may be conventional and are not a part of the invention.

The motor speed may be adjustable in order that, in welding, for example, it may be altered to produce an optimum quality of weld under a variety of operating conditions and with pipe of different thicknesses and diameter. The welding speed may also be varied as the welding torch travels around the pipe joint and this change in speed may be programmed and occur automatically by reason of the setting and operation of control switches 106 and 108.

The machine may be designed for a pipe of a certain specified diameter but may also be used with pipes of smaller diameter by inserting spacer pads in the clamping devices. Other types of clamping devices may be used instead of the clamping arrangement shown herein.

While illustrative forms of apparatus and methods in accordance within the invention have been described and shown herein, it will be understood that numerous changes may be made without departing from the general principles and scope of the invention.

What is claimed is:

1. Apparatus comprising a C-shaped frame adapted to fit over a workpiece a C-shaped sprocket segment supported by and rotatable with respect to said frame, tool supporting means attached to said sprocket segment, a power driven double width endless drive chain operatively mounted upon said frame without encircling the workpiece, one width of said chain having its periphery in driving engagement with said sprocket segment over a portion of the periphery of said segment, which is greater in extent than the open portion thereof, and means operative when the chain is opposite the open portion of the sprocket segment for supporting the periphery of the other width of said chain in a circular arc configuration concentric with and at an equal radius with said C-shaped sprocket segment, whereby the chain as a whole is supported by said chain supporting means whenever the driving width of the chain is opposite the open portion of the sprocket segment.

2. A tool rotating machine for use upon a pipe, comprising a C-shaped frame adapted to fit over and be supported on said pipe, a C-shaped sprocket segment supported by and rotatably mounted upon said frame, concentrically with the longitudinal axis of said pipe, supporting means for a work engaging tool attached to and rotatable as a unit with said sprocket segment in operative relationship to said pipe, a plurality of fully circular sprockets, at least one of which is power driven, supported by said frame and mounted in spaced relation around said pipe, a double width, endless chain, one width of said chain, engaging said C-shaped sprocket segment and said fully circular sprockets in driving relationship thereto so as to rotate said tool around said pipe without the chain encircling the pipe, and a circular chain guiding segment fixedly mounted upon said frame in the path of the other width of said chain to support said other width in a circular arc configuration while the first mentioned width of the chain is passing over the open portion of said C-shaped sprocket segment, whereby the said tool may be driven by a constant speed motor at a constant angular speed of rotation at all angular positions of said C-shaped sprocket segment.

3. A tool rotating machine for use upon a pipe, comprising a C-shaped frame adapted to fit over and be supported upon said pipe, a C-shaped circular segmental chain-guiding member integral with said frame and concentrically positioned with respect to the longitudinal axis of the pipe, said guide member having a circularly dished portion concentric with the said axis of the pipe, a C-shaped sprocket segment having a circular cylindrical concentric boss portion fitting within the said dished portion of the guide member and secured therein in rotatable bearing relationship thereto, supporting means for a tool attached to and rotatable as a unit with said sprocket segment, and a double width power driven endless chain, one width thereof engaging said sprocket segment in driving relationship thereto, and the other width thereof being supported by said circular segmental guide member in circular arc configuration, whereby the chain as a whole is substantially prevented from sagging when spanning the open portion of the said C-shaped sprocket segment.

4. A pipe welding machine comprising a C-shaped frame adapted to fit over and be supported on a pipe, a C-shaped sprocket segment supported by and rotatable with respect to said frame, a support member attached to said sprocket segment for supporting a welding torch for rotation about the pipe, a motor-driven sprocket, and a plurality of idler sprockets supported by said frame in spaced relation to each other opposite various portions of the pipe, a double width endless chain engaging said sprocket segment and each of said other sprockets in a manner to rotate the torch around the pipe without the chain encircling the pipe, a chain guide over which one width of the chain moves while the other width of the chain drives the C-shaped sprocket segment, said chain guide being of circular segmental shape to maintain the length of the path of the chain constant while the chain spans the open portion of the C-shaped sprocket segment.

5. In an arc welding machine for butt welding metal pipe, a C-shaped frame adapted to straddle said pipe and to be secured thereto, said frame having a C-shaped bearing depression therein concentrically positioned with respect to the longitudinal axis of the pipe, a C-shaped sprocket segment having a raised C-shaped bearing portion adapted to rotate in said bearing depression, means for retaining said sprocket segment in bearing relationship to said frame during rotation of said sprocket segment, supporting means for a welding head attached to and rotatable integrally with said sprocket segment, a double width power driven endless chain one width of which engages said sprocket segment in driving relationship thereto, and a C-shaped circularly segmental chain-guiding member integral with said frame positioned to support the second width of said chain in circular arc configuration when the said first width of the chain is spanning the open portion of the said C-shaped sprocket segment, whereby the welding head may be rotated at a constant speed while driven by means of said C-shaped sprocket segment.

6. In driving gear for a pipe welding machine, in combination, a motor driven gear train, a sprocket driven by said gear train, a double width roller chain driven by said sprocket, a C-shaped sprocket segment driven by one width only of said chain, idler sprockets supporting said chain in driving relation to said C-shaped sprocket segment even when said chain is spanning the open portion of said sprocket segment, a welding torch supported by said C-shaped sprocket segment in welding relationship to a pipe, and circularly segmental chain supporting means in supporting relationship to the non-driven width of the chain, said chain supporting means being so positioned as to support the chain as a whole whenever a portion of the driven width of the chain is spanning an open portion of said C-shaped sprocket segment.

7. The method of transmitting uniform circular motion to a C-shaped sprocket segment from an endless chain drive, which method comprises the steps of continuously engaging the chain with said sprocket segment over a material portion of the total circumference of the sprocket segment and continuously supporting a portion of the chain in a substantially circular arc configuration while said portion is spanning the open portion of said sprocket segment.

8. The method of driving a work-engaging tool in a circular path around a non-turnable workpiece at a substantially constant angular speed, which method comprises the steps of supporting said tool upon a C-shaped segmental driving element, engaging said driving element with a driven endless chain continuously over a material portion of the circumference of said C-shaped element, and supporting a portion of said chain in a substantially circular arc while said portion is spanning an open portion of said C-shaped element.

References Cited in the file of this patent
UNITED STATES PATENTS

| | | |
|---|---|---|
| 2,013,630 | Goldsborough | Sept. 3, 1935 |
| 2,721,248 | Kirkpatrick | Oct. 18, 1955 |
| 2,795,689 | McNutt | June 11, 1957 |